United States Patent [19]

Gernet et al.

[11] Patent Number: 5,151,677
[45] Date of Patent: Sep. 29, 1992

[54] RAPID ORIENTATION APPARATUS FOR AN OBSERVATION AND/OR WEAPON-CARRYING VEHICLE

[75] Inventors: Pierre Gernet, Ennetbaden; Werner Steinemann, Rumlang; Paul-Andre Margot, Zurich, all of Switzerland

[73] Assignee: Oerlikon-Contraves AG, Zurich, Switzerland

[21] Appl. No.: 650,286

[22] Filed: Feb. 4, 1991

[30] Foreign Application Priority Data

Feb. 9, 1990 [CH] Switzerland ............... 00424/90

[51] Int. Cl.⁵ .......................... H01C 10/10
[52] U.S. Cl. ......................... 338/99; 338/114; 338/162; 89/41.02; 89/41.17
[58] Field of Search .................. 338/99, 114, 162; 89/41.02, 41.04, 41.09, 41.17; 244/3.16; 73/1 E

[56] References Cited

U.S. PATENT DOCUMENTS

| 3,245,017 | 4/1966 | Russell ............... 338/2 |
| 3,634,008 | 1/1972 | Plummer et al. ........ 355/56 |
| 3,640,178 | 2/1972 | Chatham et al. ....... 89/41.09 |
| 3,766,827 | 10/1973 | Teiling ............... 89/41.02 |
| 4,748,433 | 5/1988 | Jackson et al. ........ 338/6 |
| 4,831,355 | 5/1989 | Schulz ............... 338/162 |

FOREIGN PATENT DOCUMENTS

| 0229601 | 7/1986 | European Pat. Off. . |
| 0191555 | 8/1986 | European Pat. Off. . |
| 0260365 | 3/1988 | European Pat. Off. . |
| 0284787 | 10/1988 | European Pat. Off. . |
| 2216734 | 10/1972 | Fed. Rep. of Germany . |
| 3604707 | 8/1987 | Fed. Rep. of Germany . |
| WO8704848 | 8/1987 | World Int. Prop. O. . |

OTHER PUBLICATIONS

Berthold, Gottfried, "Potentiometrische Sensoren als Weggeber und Stellungsmelder", Electronik, vol. 35, No. 14, Jul. 1986, pp. 92-96.

Primary Examiner—Marvin M. Lateef
Attorney, Agent, or Firm—Sandler, Greenblum & Bernstein

[57] ABSTRACT

The apparatus serves for rapid orientation of a periscope and, if desired, a weapon barrel with respect to a sighted target. A contact potentiometer is proved as angle transmitter for an electric servo control. The contact potentiometer is annularly arranged around the observer's post at the vehicle, preferably in the region of the rim portion of the observation hatch of the vehicle. The contact potentiometer comprises an arcuate, hose-like insulating envelope defining a radial direction. A resistance track and a contact track are laid within the insulating envelope at a predeterminate spacing therebetween in the radial direction of the insulating envelope. By touching the contact potentiometer in the direction of sight, there is tapped thereat a resistance value corresponding to the direction with which the periscope or, if desired, the weapon barrel has to be aligned by a swivelling motion.

17 Claims, 1 Drawing Sheet

RAPID ORIENTATION APPARATUS FOR AN OBSERVATION AND/OR WEAPON-CARRYING VEHICLE

BACKGROUND OF THE INVENTION

1. Field of the Invention

The present invention relates to a new and improved rapid orientation apparatus, particularly for an observation and/or weapon-specifically, to a rapid orientation apparatus of this type containing electric circuit means which serve as an angle transmitter.

2. Background and Other Information

In vehicles of the aforementioned type such as, for example, combat tanks, the ground or terrain is continuously visually observed from the interior of the vehicle, for instance, directly from the open hatch or by means of fixedly installed angular or corner reflectors. In the event of the discovery of a possible target, an acquisition or determination of such target must be effected by means of a rotatable mounted periscope for more accurate evaluation. The field of view of such periscope, however, is strongly restricted.

For such target acquisition by means of the rotatably mounted periscope it is required that the periscope (and, if desired the weapon barrel) be swivelled as rapidly as possible so as to be oriented in the direction towards the target. This implies that the observer must transfer the visually observed direction to the periscope in order for the observer to be able to rapidly acquire his or her orientation in the terrain when subsequently viewing the same through the periscope. Conventionally, such orientation is generally effected by actuating a laying handle or control stick for servo-driving the rotation or swiveling motion of the periscope or turret. During such operation, the orientational direction is indicated at a scale which is located in the interior of the vehicle. Consequently, the observer generally must alter the attitude of the observer's body and transfer the orientational direction to the scale. Retrieval of the orientational direction is thereby rendered more difficult and valuable time is lost.

For this reason, it has been attempted to approximately detect the orientational direction by means of a plurality of electrical control keys which are distributed along the hatch circumference, and to rotate or swivel the periscope or turret into the corresponding, approximate angular position by means of a servo drive. Such device, however, is too imprecise when containing, for example, four or eight keys. Conversely, using a greater multitude of keys would be connected with a disproportionate expenditure with regard to the installation, the wiring and the control.

SUMMARY OF THE INVENTION

Therefore, with the foregoing in mind, it is a primary object of the present invention to provide a new and improved construction of a rapid orientation apparatus for an observation and/or weapon-carrying vehicle provided with an observer's post and which apparatus is not afflicted with the drawbacks and limitations of the prior art constructions heretofore discussed.

A further significant object of the present invention is directed to a new and improved construction of a rapid orientation apparatus for an observation and/or weapon-carrying vehicle provided with an observer's post and which apparatus ensures, at reduced expenditure, rapid swivelling of the periscope or weapon barrel into alignment with the observed direction at sufficient resolution and precision.

Another important object of the present invention aims at providing a new and improved construction of a rapid orientation apparatus for an observation and/or weapon-carrying vehicle provided with an observer's post and which apparatus provides the desired rapid orientation at reduced expenditure and yet affords highly reliable operation thereof, without being subject to breakdown or malfunction.

Now in order to implement these and still further objects of the invention, which will become more readily apparent as the description proceeds, the rapid orientation apparatus of the present development is manifested, among other things, by the features that a contact potentiometer is substantially annularly arranged to surround the observer's post or stand at the vehicle. The contact potentiometer contains an arcuate, hose-like insulating envelope or sleeve defining a radial direction. A resistance track and a contact track are laid or positioned at a predeterminate spacing with respect to each other in the radial direction within the arcuate, hose-like insulating envelope.

The inventive rapid orientation apparatus can be manufactured and installed at the vehicle at favorable costs, is of a robust nature and serves as a continuous (analog) angle transmitter for the servo drive. By briefly touching or contacting the contact potentiometer in the detected orientational direction, the observer locally makes contact between the resistance track and the contact track and thereby directly produces an angle-dependent resistance or resistance value.

So-called contact potentiometers are known as such, however, in a straight, bar-shaped or rod-like construction in order to serve, for example, as displacement pickups or resistance transmitter in electronic musical instruments, see, for example, European Published Patent Application No. 0,260,365, published Mar. 23, 1988; European Published Patent Application No. 0,284,787, published Oct. 5, 1988; and German Published Patent Application No. 3,604,707, published Aug. 27, 1987.

The use of a contact potentiometer for indicating an angle is illustrated in European Published Patent Application No. 0,229,601, published July 22, 1987, which discloses an annular metal frame and an electrically conducting strip spaced therefrom. The frame and strip are insulated and affixed to an external surface of a carrier. This contact potentiometer may be used as a bumper on a mobile robot to determine the position an obstacle contacts the periphery thereof.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction of the rapid orientation apparatus has been illustrated therein as is needed to enable one skilled in the art to readily understand the underlying principles and concepts of the present development.

Figure 1:
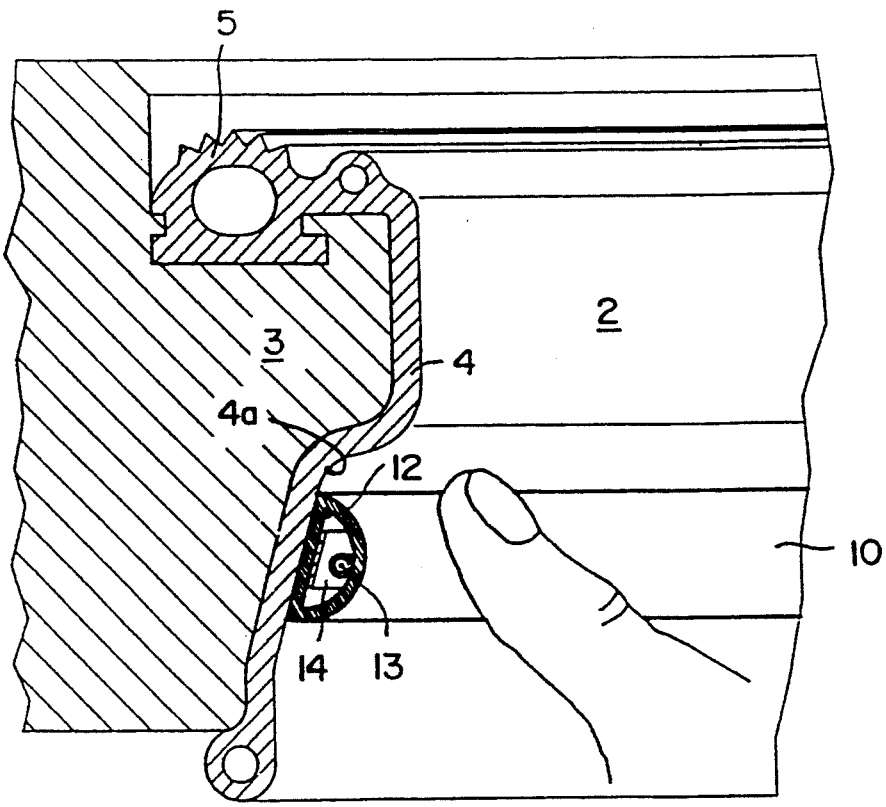
FIG. 1 is a sectional and elevational partial view of an exemplary embodiment of the inventive rapid orientation apparatus in which a contact potentiometer is arranged in the region of a rim portion of a vehicle hatch.

Turning attention now specifically to FIG. 1 of the drawings, the apparatus illustrated therein by way of example and not limitation will be seen to be arranged at an observation hatch 2 of a vehicle such as, for example, an observation vehicle or weapon-carrying vehicle. The observation hatch 2 contains a rim portion 3 which is provided with a profiled lining 4 which may be made of, for instance, rubber and extends along the circumference of the rim portion 3 in conventional manner. An annular seal or sealing member 5 for sealing the not specifically illustrated hatch cover may be formed to be integral with the profiled lining 4.

Along the rim portion 3 of the observation hatch 2, i.e., annularly around an observer's post or stand, there is arranged a contact potentiometer which is generally designated by the reference character 10. The contact potentiometer 10 comprises an arcuate, hose-like insulating envelope or sleeve 12 which defines a radial direction and in which a resistance track 13 and a contact track 14 are laid or disposed at a predeterminate spacing from each other in the radial direction defined by the insulating envelope or sleeve 12.

The arcuate, hose-like insulating envelope or sleeve 12 preferably is constructed, as illustrated, in the manner of a hollow, semi-cylindrical profiled member. A base surface 12a of the arcuate, hose-like insulating envelope or sleeve 12 can be, for example, adhesively bonded to the profiled lining 4 as illustrated in FIG. 1 of the drawings. Also, as illustrated in dash-dotted lines in FIG. 2, lateral lugs 8 can be formed to be integral with the arcuate, hose-like insulating envelope or sleeve 12 for engagement with a schematically illustrated groove, generally indicated by reference character 8b, preferably of T-shape which then would be provided in the profiled lining 4. The profiled lining 4 also can be directly integrated into the hatch lining, i.e., constitute part of such hatch lining.

Advantageously the contact potentiometer 10 is laid within a recess or groove 4a in the region of the rim portion 3 of the observation hatch 2 in order to protect the same against unintentional damage and rough or heavy impacts. An improved protection against erroneous or unintentional operation can be accomplished by imbedding the contact potentiometer 10 between two beads which extend parallel to each other and to the contact potentiometer 10 and are formed at the profiled lining 4.

It will be self-understood that the contact potentiometer 10 need not necessarily extend along a precise circular arc; in fact, there can be bridged thereby radial projections or recesses which may be present in the rim portion 3 of the observation hatch 2, or the rim portion 3 as such of the observation hatch 2 may have a non-circular, for example, elliptic configuration.

The contact potentiometer 10 is connected to a servo control for the rotary drive means for rotating or swivelling the periscope or weapon barrel. The observer is stationed at the center of the annularly arranged contact potentiometer 10. When the observer touches the contact potentiometer 10 in an intended, i.e., laying or aiming direction extending from a virtual hatch center, there is tapped at the contact potentiometer 10 an electrical potential which is a direct measure of the orientational direction into which the periscope or weapon barrel must be swivelled, i.e., with which the periscope or weapon barrel must be aligned. The value of this electrical potential can be stored in the servo control as a reference value. In the event that the shape of the hatch 2 deviates from a circular arc, the tapped potential or voltage is transformed or converted in any suitable manner into a corresponding angle or angle value. Also, a follow-up of the periscope or weapon barrel with respect to the vehicle movement can be readily attained using conventional circuit means. By virtue of such arrangement of the contact potentiometer 10 as a position transmitter or angle transmitter, the intended or reference position and the orientation is effected in very rapid manner, at high resolution and with sufficient precision.

By using flexible or elastic materials for the arcuate, hose-like insulating envelope or sleeve 12 as well as for the resistance track 13 and the contact track 14, it is rendered possible to manufacture the contact potentiometer 10 at the required length and in straightened shape; subsequently, during installation, the contact potentiometer 10 can be bent into the desired annular configuration. During such operation, due account can be taken of the fact that there exists a length difference between the contact track 14 and the resistance track 13, since, in the bent state of the contact potentiometer 10, the two tracks 13 and 14 extend at difference radii of the arcuate shape or configuration of the contact potentiometer 10.

Figure 2:
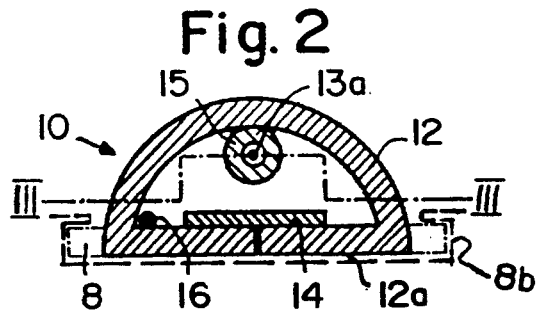
FIG. 2 is a section at an increased scale though the contact potentiometer of the apparatus shown in FIG. 1.
Figure 3:
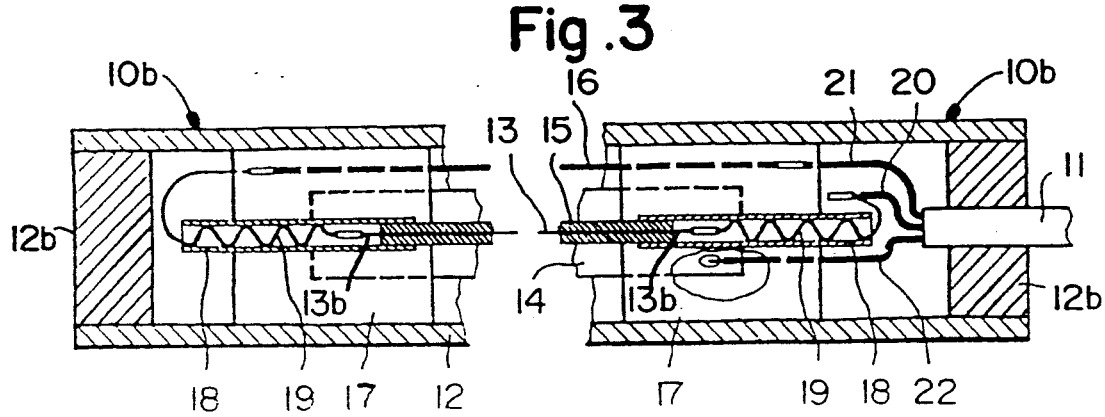
FIG. 3 is a longitudinal section along the line III—III in FIG. 2 and shows, in a straightened development, end portions of the contact potentiometer illustrated in FIG. 2.

Different sections of a suitable exemplary construction of the contact potentiometer 10 will be apparent from FIGS. 2 and 3. A resistance wire 13a is used and ensures sufficient linearity of the resistance along its length. The resistance wire 13a is lengthwise movably guided within a tube or hose 15 made of an electrically conductive elastomer. The length of the tube or hose 15 is not connected in circuit with the potentiometer circuit but merely serves as a "contact bridge" whenever the resistance wire 13a is pressed against the contact track 14. The contact track 14 may constitute, for example, a flat-profiled member made of metal such as, for instance, a stainless steel strip or a flat-profiled member made of plastics provided with a metallic coating; such flat-profiled member can readily bent to form a cylindrical surface. In the event of that, as illustrated in FIG. 1, the base surface 12a of the arcuate, hose-like insulating envelope or sleeve 12 is intended to be applied to a conical surface, the contact track 14 is preferably used in the form of a flat-profiled member made of an electrically highly-conductive elastomer.

The arcuate, hose-like insulating envelope or sleeve 12 also may comprise two layers with an intermediate layer therebetween which is in the form of a metallic mesh which, when appropriately connected to other members of the installation, forms a shield for protection against interferences due to external electromagnetic fields.

An advantageous construction of end portions 10b of the contact potentiometer 10 will be apparent from FIG. 3 which shows a longitudinal section through the end portions 10b of the contact potentiometer 10 along the section line III—III in FIG. 2. Each one of the two end portions 10b of the contact potentiometer 10 is provided with a respective plug 12b for closing the arcuate, hose-like insulating envelope or sleeve 12. The connecting lines or leads 20, 21 and 22 of the contact potentiometer 10 and which connecting lines or leads lead to a suitable control circuit, are preferably conjointly led out from the arcuate, hose-like insulating envelope or sleeve 12 at one of the two end portions 10b of the contact potentiometer 10, in the illustrated example by means of a multicore cable 11 as shown on the right-hand side of FIG. 3.

Inwardly of the plugs or end plugs 12b there are located respective insulating layers 17 between respective end portions of the contact track 14 and respective end portions of the tube or hose 15; the end portions of the tube or hose 15 are structured in the form of a tube piece 18. Each tube piece 18 encloses or embraces a respective end portion of the tube or hose 15. The respective ends or end portions of the somewhat longer resistance wire 13a are connected with respective flexible stranded wires or conductors 19. The flexible strand wire or conductor 19 shown on the right-hand side of FIG. 3, is directly connected with the connecting wire or lead 20 of the multicore cable 11 whereas the stranded wire or conductor 19 shown on the left-hand side of FIG. 3 is connected to the connecting wire or lead 21 by means of a return line or conductor 16 which is laid or extends within the arcuate, hose-like insulating envelope or sleeve 12. The third connecting wire or lead 22 of the multicore cable 11 is connected to one end or end portion of the contact track 14, in the illustrated example the end portion of the contact track 14 adjacent the plug 12b on the right-hand side of the drawing of FIG. 3. Both ends or end portions of the contact track 14 are retained or fixedly held by means of the respective aforementioned insulating layers 17.

By virtue of the illustrated arrangement, the aforementioned length compensation during bending of the contact potentiometer 10 is attained due to the fact that the ends or end portions of the lengthwise moveable resistance wire 13a exit to a greater extent from the tube or hose 15 in the direction into the respective tube pieces 18 whereas the tube or hose 15 is slightly upset in lengthwise direction.

In comparison to the arrangement described hereinbefore with reference to FIGS. 2 and 3, there is also conceivable a reverse arrangement in which the contact track 14 constitutes, for example, a highly conductive wire or stranded wire and takes the position of the resistance wire 13a whereas the aforenoted position of the contact track 14, the, is assumed by the resistance track 13. Such resistance track may assume, for example, the shape or configuration of a flat-profiled member and may constitute, for example, a film resistor placed upon a profiled support member which is made of a flexible insulating material.

Figure 4:
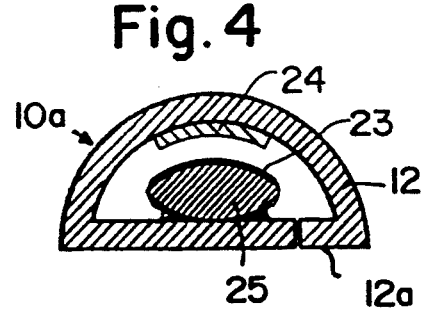
FIG. 4 is a cross-section through a modified construction of the, contact potentiometer analogous to the contact potentiometer shown in FIG. 2.

A further modification of the contact potentiometer 10 is shown in FIG. 4 in a cross-section corresponding to the illustration of FIG. 2. In this modified contact potentiometer 10a the contact track 24 is located at a lesser radius than the resistance track 23; however, the arrangement can also be such that, analogously to FIG. 2, the contact track is located at a larger radius than the resistance track. The contact track 24, may constitute, for example, a flexible metal braiding or a flat-profiled member made of an electrically conductive elastomer which is attached to the internal wall of domed portion of the arcuate, hose-like insulating envelope or sleeve 12. The resistance track may constitute, for example, a resistance wire 23 and such resistance wire 23 may form closely wound coils upon a profiled support member 25 which is made of a flexible insulating material. Such construction also has the required flexibility and, also in this construction, the base surface 12a of the arcuate, hose-like insulating envelope or sleeve 12 can be mounted at a conically shaped mounting surface.

Further embodiments of the flexible contact potentiometer of the illustrated type containing flexible resistance tracks and/or contact tracks inclusive of length compensation will be immediately evident to the person skilled in the art on the basis of the knowledge of the instant invention.

While there are shown and described present preferred embodiments of the invention, it is to be distinctly understood that the invention is not limited thereto, but may be otherwise variously embodied and practiced within the scope of the following claims.

What is claimed:

1. A rapid orientation apparatus for an observation and/or weapon-carrying vehicle provided with an observer's post and an observation hatch, comprising:
   electric circuit means serving as an angle transmitter;
   said electric circuit means containing a contact potentiometer;
   said observation hatch defining a rim portion, said contact potentiometer being substantially annularly arranged around the observer's post and extending along said rim portion;
   said contact potentiometer comprising:
   (i) a arcuate, hose-like insulating envelope defining a radial direction;
   (ii) a resistance track;
   (iii) a contact track; and
   said resistance track and said contact track being disposed within said arcuate, hose-like insulating envelope at a predeterminate spacing from each other as viewed in said radial direction.

2. The apparatus as defined in claim 1, wherein:
   said arcuate, hose-like insulating envelope contains a mesh shield.

3. The apparatus as defined in claim 1, wherein:
   said rim portion of said observation hatch is provided with a profiled linking; and
   said contact potentiometer being integrated into said profiled lining.

4. The apparatus as defined in claim 1, wherein:
   said rim portion of said observation hatch contains a profiled lining;
   form-locking connecting means provided at said profiled lining and said contact potentiometer; and
   said profiled lining and said contact potentiometer being form-lockingly interconnected by said form-locking connecting means.

5. The apparatus as defined in claim 4, wherein:
   said form-locking connecting means contain lug means and corresponding groove means for permitting form-locking interconnection between said profiled lining and said contact potentiometer.

6. The apparatus as defined in claim 3, wherein:
said profiled lining contains two beads protruding inwardly from said profiled lining at a predeterminate height;
said arcuate, hose-like insulating envelope of said contact potentiometer having a predeterminate height;
said two beads of said profiled lining extending substantially parallel to said contact potentiometer on opposite sides of said contact potentiometer; and
said predeterminate height of said two beads of said profiled lining being at least equal to said predeterminate height of said arcuate, hose-like insulating envelope of said contact potentiometer.

7. The apparatus as defined in claim 4, wherein:
said profiled lining contains two beads protruding inwardly from said profiled lining at a predeterminate height;
said arcuate, hose-like insulating envelope of said contact potentiometer having a predeterminate height;
said two beads of said profiled lining extending substantially parallel to said contact potentiometer on opposite sides of said contact potentiometer; and
said predeterminate height of said two beads of said profiled lining being at least least equal to said predeterminate height of said arcuate, hose-like insulating envelope of said contact potentiometer.

8. The apparatus as defined in claim 1, wherein:
said resistance track of said contact potentiometer constitutes a resistance wire.

9. The apparatus as defined in claim 8, further including:
a hose surrounding and longitudinally guiding said resistance wire; and
said hose comprising an electrically conductive elastomer.

10. The apparatus as defined in claim 8, further including:
a profiled support member supporting said resistance wire;
said resistance wire being wound upon said profiled support member; and
said profiled support member comprising a flexible insulating material.

11. The apparatus as defined in claim 1, wherein:
said resistance track constitutes a flat-profiled member comprising an electrically conductive elastomer.

12. The apparatus as defined in claim 1, wherein:
said resistance track constitutes a film resistor;
a profiled support member supporting said film resistor and comprising of flexible insulating- material; and said film resistor being formed at said profiled support member.

13. The apparatus as defined in claim 1, wherein:
said contact track constitutes a metallic flat-profiled member.

14. The apparatus as defined in claim 1, wherein:
said contact tracks constitutes a flat-profiled member comprising an electrically conductive elastomer.

15. The apparatus as defined in claim 9, further including:
a plurality of connecting leads for connection to said resistance wire;
a plurality of flexible stranded wires for interconnecting said connecting leads and said resistance wire;
said resistance wire having two end portions; and
said two end portions of said resistance wire being connected to respective ones of said plurality of connecting leads through respective ones f said plurality of stranded wires within said arcuate, hose-like insulating envelope.

16. The apparatus as defined in claim 1, further including:
a plurality of connecting leads for connection to said contact track and said resistance track;
said resistance track having two end portion;
said contact track and said two end portions of said resistance track being connected to respective ones of said plurality of connecting leads;
said plurality of connecting leads being led out from said arcuate, hose-like insulating sleeve in said predeterminate end region of said contact potentiometer.

17. The apparatus as defined in claim 1, wherein:
said arcuate, hose-like insulating envelope constitutes a hollow, semi-cylindrical profiled member.

* * * * *